United States Patent
Kaliyannan Eswaran et al.

(10) Patent No.: US 12,204,485 B2
(45) Date of Patent: Jan. 21, 2025

(54) DATA REFRESH CYCLE FOR ASYNCHRONOUS DEVICE COMMUNICATION

(71) Applicant: Hamilton Sundstrand Corporation, Charlotte, NC (US)

(72) Inventors: Pravinsharma Kaliyannan Eswaran, Karnataka (IN); Annamalai Nallathambi, Tamil Nadu (IN); Sneha Ashok Moon, Karnataka (IN); Akansha Bhosle, Madhya Pradesh (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 50 days.

(21) Appl. No.: 18/363,253

(22) Filed: Aug. 1, 2023

(65) Prior Publication Data
US 2024/0362179 A1    Oct. 31, 2024

(30) Foreign Application Priority Data

Apr. 27, 2023   (IN) ............................. 202311030369

(51) Int. Cl.
  *G06F 13/42*        (2006.01)
(52) U.S. Cl.
  CPC .. *G06F 13/4282* (2013.01); *G06F 2213/0002* (2013.01)
(58) Field of Classification Search
  None
  See application file for complete search history.

(56) References Cited

U.S. PATENT DOCUMENTS

| | | | |
|---|---|---|---|
| 4,623,997 A | 11/1986 | Tulpule | |
| 4,625,307 A | 11/1986 | Tulpule et al. | |
| 4,635,254 A | 1/1987 | Tulpule et al. | |
| 4,698,753 A | 10/1987 | Hubbins et al. | |
| 5,325,359 A | 6/1994 | Jordan et al. | |
| 5,377,184 A * | 12/1994 | Beal | H04L 5/14 370/428 |
| 5,663,994 A | 9/1997 | Chu | |
| 6,122,747 A * | 9/2000 | Krening | G06F 13/385 712/15 |
| 6,708,239 B1 * | 3/2004 | Ellerbrock | H04L 12/40032 710/72 |
| 8,266,466 B2 | 9/2012 | Eshraghian et al. | |
| 8,536,988 B2 | 9/2013 | Ritter | |

(Continued)

OTHER PUBLICATIONS

European Search Report for Application No. 24173068.8, mailed Aug. 28, 2024, 12 pages.

*Primary Examiner* — Henry Tsai
*Assistant Examiner* — Dean Phan
(74) *Attorney, Agent, or Firm* — CANTOR COLBURN LLP

(57) ABSTRACT

An asynchronous communication system configured to operate a MIL-1553 protocol. The system includes: a bus; a bus controller coupled to the bus that is configured to control access to the bus; a remote terminal connected to the bus; a device controller connected to the remote terminal; and a read/write overlap avoidance latch connected to the remote terminal. The read/write overlap avoidance latch provides an active signal to the device controller that prevents the device controller from writing data to the remote terminal while the bus controller is reading data from the device controller during a read cycle.

15 Claims, 4 Drawing Sheets

(56) References Cited

U.S. PATENT DOCUMENTS

| | | |
|---|---|---|
| 9,542,531 B2 | 1/2017 | Chmiel et al. |
| 10,671,558 B1 | 6/2020 | Evans |
| 10,812,251 B2 | 10/2020 | Evans |
| 2020/0403745 A1* | 12/2020 | Fang ............... H04B 7/024 |
| 2023/0013461 A1 | 1/2023 | Bouchet et al. |

* cited by examiner

DATA REFRESH CYCLE FOR ASYNCHRONOUS DEVICE COMMUNICATION

CROSS-REFERENCE TO RELATED APPLICATIONS

This application claims the benefit of Indian patent application No. 202311030369 filed Apr. 27, 2023 the disclosure of which is incorporated herein by reference in its entirety.

FIELD

The examples disclosed herein relate to systems and methods for refreshing data between asynchronous devices in a communication network.

BACKGROUND

Asynchronous devices are devices that operate without reference to a global clock system. The processing clock of asynchronous devices therefore operates independently of any frequency in the system to which the device is connected to. When considering two asynchronous devices, these devices will exhibit asynchronous behaviour relative to each other even if they appear identical from a hardware and software perspective. This is due to the tolerances on the components and the processing clock. The result of this asynchronous behaviour is that the processing cycle of one device will be slower than the processing cycle of the other device.

One way to solve this problem is to roughly synchronize one of the devices with the other device. This results in a dependency between the devices in what is known as a master/slave relationship. In such a system, a bus controller can be master and the remote terminal the slave. The MIL-STD-1553 is a standard that can be used to control such asynchronous systems.

In such systems, the remote terminal and bus controller may be handled by independent controllers. During operation, the remote terminal has a scheduled time interval (load interval herein) when it "loads" data into the registers. At another present time (read interval), the bus controller can cause the data loaded into the registers to be "read" and provided to, for example, a system controller.

Due to inaccuracies in the independent clocks at both ends, read and write intervals can periodically overlap one another. During the overlap event, as the read cycle got higher priority, the write cycle is ignored. This can result in the bus controller providing stale data for the entire time the intervals overlap.

SUMMARY

According to an embodiment, an asynchronous communication system configured to operate a MIL-1553 protocol is disclosed. The system includes: a bus; a bus controller coupled to the bus that is configured to control access to the bus; a remote terminal connected to the bus; a device controller connected to the remote terminal; and a read/write overlap avoidance latch connected to the remote terminal. The read/write overlap avoidance latch provides an active signal to the device controller that prevents the device controller from writing data to the remote terminal while the bus controller is reading data from the device controller during a read cycle.

In any prior embodiment, the remote terminal can generate the active signal output at an active output during a ready cycle commanded by the bus controller.

In any prior embodiment, the read/write overlap avoidance latch includes an input, a clock input and an output, wherein the input is connected to a power source, the clock is connected to the active output and the output is connected to the device controller, wherein the input is latched to the output on a rising edge of the active signal.

In any prior embodiment, the read/write overlap avoidance latch may include a clear input (CLR) that resets the output.

In any prior embodiment, the device controller can delay a write operation from the device controller to the remote terminal for a delay period.

In any prior embodiment, the delay period can be greater than the read cycle.

In any prior embodiment, the read/write overlap avoidance latch can be a rising edge D flip-flop.

In any prior embodiment, the device controller pulses the CLR input to reset the read/write overlap avoidance latch after the delay period.

In any prior embodiment, the device controller can include instructions that cause the device controller to transfer information from the device controller to the remote terminal during a write cycle.

In any prior embodiment, the device controller can further include instructions that causes the remote terminal to delay the write cycle during a read cycle.

In any prior embodiment, the device controller further can include instructions that causes the remote terminal to perform a write cycle and then rest the read/write overlap avoidance latch.

Also disclosed is a method of operating asynchronous communication system according to a MIL-1553 protocol. The method can be performed with any prior embodiment of any embodiment disclosed herein. In one aspect, the method includes: providing a bus and a bus controller coupled to the bus that is configured to control access to the bus; connecting a remote terminal to the bus; connecting a device controller to the remote terminal; coupling a read/write overlap avoidance latch to the remote terminal; and providing an active signal to the device controller that prevents the device controller from writing data to the remote terminal while the bus controller is reading data from the device controller during a read cycle.

In any prior embodiment, the remote terminal can generate the active signal output at an active output during a ready cycle commanded by the bus controller.

In any prior embodiment, the read/write overlap avoidance latch can include a clear input (CLR) that resets the output and the method can further include: delaying a write operation from the device controller to the remote terminal for a delay period.

In any prior embodiment, the delay period can be greater than the read cycle.

DETAILED DESCRIPTION

The examples described herein provide a rescheduling mechanism for a remote terminal that can reduce or eliminate the above noted issues of the bus controller receiving stale data.

Figure 1:
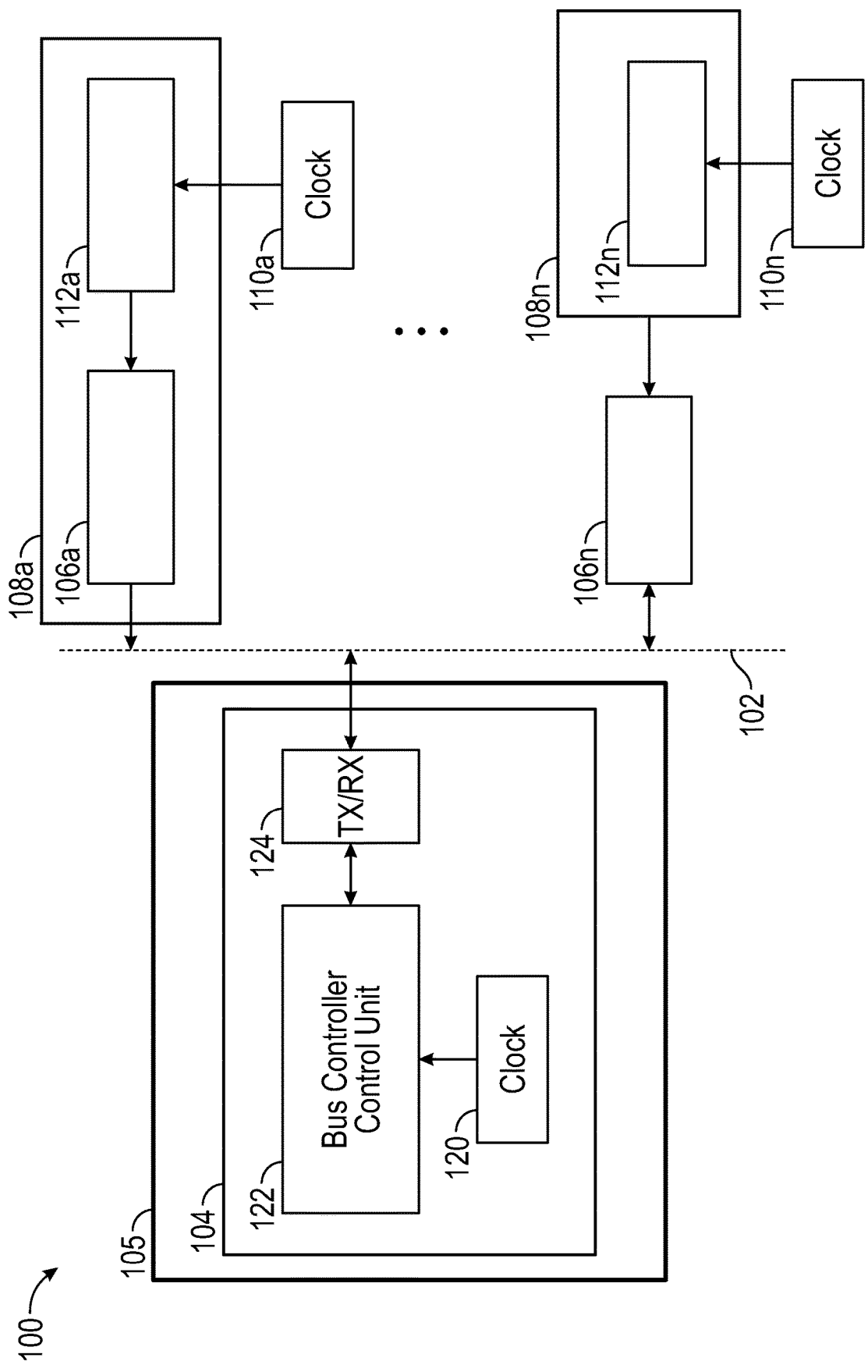
FIG. 1 shows an example of an asynchronous communication system into which embodiments may be implemented and is used to more fully develop a problem that embodiments herein disclosed may solve.

FIG. 1 shows a system 100 according to one embodiment. The system 100 may be implementing the MIL-STD-1553 communication standard in one embodiment.

The system includes a bus 102. The bus 102 can be a serial bus in one embodiment and may consist of two wires, each with 70-85Ω impedance at 1 MHZ. As shown, the system also includes a bus controller 104 and one or more remote terminals 106.

The bus controller 104 can be part of a mission computer 105 but that is not required. The bus 102 can be used to move data around the system 100. In particular, in combination with the bus controller 104, data can be moved from the controller 104 to any of the remote terminals 106 and vice versa. Further, the bus controller 104 can cause data to be transferred between any of the remote terminals 104. In one embodiment, the controller 104 can be the only device that can request a transfer.

The remote terminal 106a . . . 106n can be used to collect data from a device controller 108. The remote terminal 106a can be part of the device controller (e.g., as in device controller 108a) or it can a separate unit as such a remote terminal 106n that is separate from but connected to a device controller 108n. Each device controller 108 receives a clock signal from a related device controller clock 110a . . . 110n. Each of these clocks can run at the same rate but overtime the clocks may drift relative to one another and, importantly, relative to a bus controller clock 120 related to the bus controller 104.

Examples of controllers 108 can include any element on an aircraft. For example, the controllers can control radar or missile system of an aircraft.

The controllers 108 each also include a control unit 112. Each control unit 112 is responsible for the general operation of the controller 108 it is associated with. The functions of this control unit 112 include, but are not limited to, writing data to the remote terminal 106, collecting data such as temperature, pressure, force from a controlled device, and issuing commands to a controlled device such as an actuator that controls an aircraft aerodynamic surface (e.g., wing, flat, slat, stabilizer, etc.).

The bus controller 104 includes as noted above, includes a bus controller clock 120. The bus clock 120 can have drift relative to the device controller clocks 110a . . . 110n.

The bus controller 104 also includes bus controller control unit 122 that can divide the clock, schedule commands and deliver the commands to a bus controller transceiver/receiver 124. This bus controller transceiver/receiver 124 can provide instructions to and receive data from the remote terminals 106.

The remote terminal 106a can be part of the device controller (e.g., as in device controller 108a) or it can a separate unit as such a remote terminal 106n that is separate from but connected to a device controller 108n. Each device controller 108 receives a clock signal from a related device controller clocks 110a . . . 110n. Each of these clocks can run at the same rate but overtime the clocks may drift relative to one another and, importantly, relative to a bus controller clock 120 related to the bus controller 104.

Figure 2:
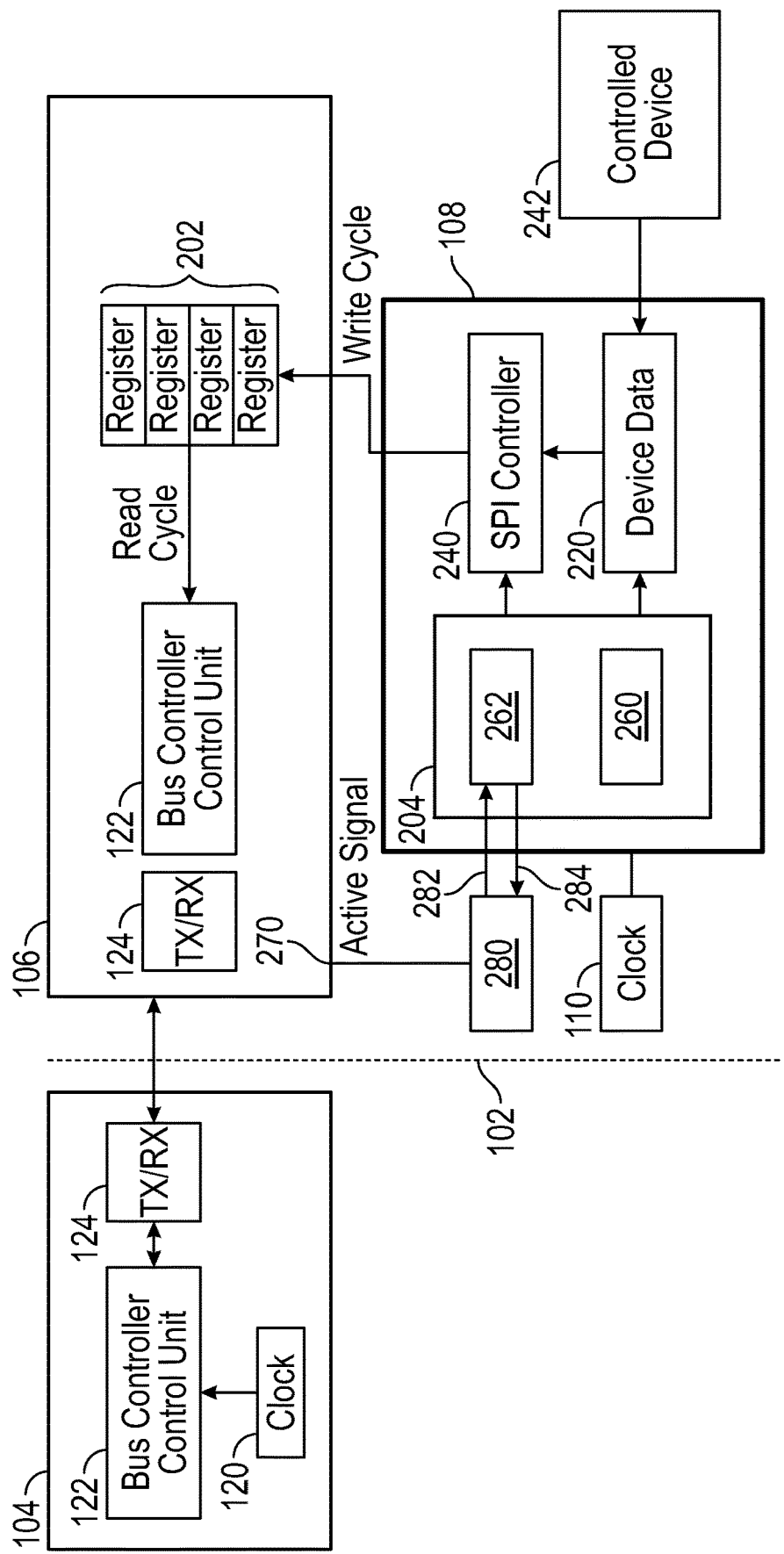
FIG. 2 an example of a portion of an asynchronous communication system according to one embodiment.

FIG. 2 shows the connections between one of the remote terminals/connections 106 and the bus controller 104. The description related to FIG. 2 is applicable to each remote terminal 106a-106n shown in FIG. 1.

The remote terminal 106 is connected to a device controller 108. As noted above, the remote terminal 106 be used to collect data from a device controller 108. The data that is receives can be stored in registers 202. This update can be, for example, provided on a periodic basis. The update can be controlled by control software 204 within the device controller. In one embodiment, the control software 204 (e.g., task scheduler) causes sensor or other data from the device controller 108 to be loaded into registers 202 in the remote terminal 106.

The device controller 108 includes a device data store 220. The device data store 220 includes the sensor or other data that is received from a controlled device 242. The controlled device 242 can be any device on an aircraft. For example, the controlled device 242 can by an actuator, an IR sensor, radar systems, rocket launchers, etc.

During a write cycle, the data in the device data store 220 is provided from the device controller 108 to the registers 202. This write cycle can include utilizing a serial peripheral interface (SPI) controller 240. The control software 204 shown in FIG. 2 can be step wise software that performs a MIL-1553 SPI data write cycle and can be looping software that includes a series of sequential tasks (e.g., task 1, task 2, etc.) During normal operation, the tasks that form the write cycle can all be completed in a specified period of time. There is typically extra time to complete the tasks in the loop in the control software 204 so delay can be provided to series of tasks.

As noted above, the bus controller 104 has control over the remote terminal 106. That is, when the bus controller 104 orders a read from the remote terminal, the data in the registers 202 is provided to the bus controller. During that time (e.g., during a read cycle) data in the registers 202 is provided from registers 202 to the bus controller control unit 122. During the read cycle, the registers 202 cannot be written to. If the read cycle overlaps with a write cycle, data in the registers 202 is not updated and the read cycle will have stale or "old" data. This can occur for the entire time of the overlap of cycles and is due to skew between the clocks 120/110.

Figure 3:
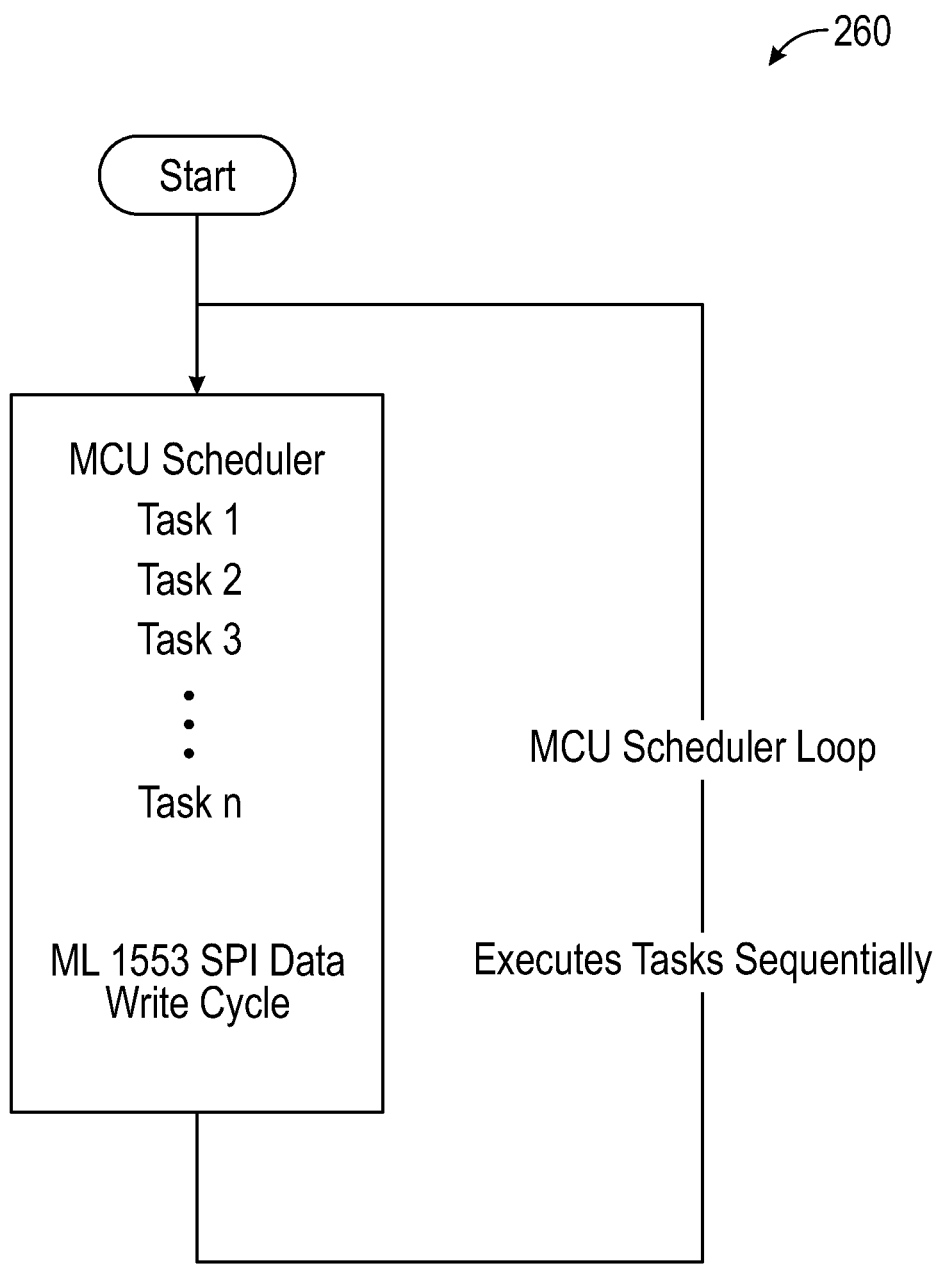
FIG. 3 shows a pseudocode method that may be performed during a write cycle.

An example of a write cycle 260 that can be performed by the control software 204 is shown in pseudo-code in FIG. 3. As shown, the write cycle includes sequential tasks. These tasks (task 1, task n) that are all part of the write cycle. These tasks are not changed in embodiments herein. Rather, a delay can be imparted before these tasks begin to ensure that the there is no overlap. To that end, the control software 204 can include a delay function 262 that delays the write cycle 260 to ensure that it does not overlap with a read cycle.

In the following discussion, it shall be assumed that the read cycle requires about 300 μs. This is typical in the MIL-1553 protocol.

In one embodiment, the remote terminal 106 includes an active output 270 that provides an active signal during a read cycle. The active output 270 can be an input/output pin in one embodiment. As discussed below, any time this active output 270 is "on" (e.g., the active signal is high and thus indicates a read cycle is occurring) the delay function 262 will delay the write cycle 260. In one embodiment, the delay is longer than the ready cycle. For example, if the read cycle is 300 μs long the delay function 262 will delay the write cycle 260 at least that long or longer (e.g., 350 μs). In this manner, the two cycles cannot overlap and, thus, the data in the registers 202 will be current regardless of clock skew.

In one embodiment, the active signal is provided to a latch. The latch 280 will latch the active signal output by active output 270 (e.g., latched signal 282) to the control software 204 for at least the time required for a read cycle. As discussed above, the time for read cycle can be specified by the protocol or can otherwise be set to predetermined time. The latch 280 can be unlatched (e.g., reset) by a reset signal 284 after the delay time and after the write cycle 260 has been completed. As such, the latch may be referred to as a read/write overlap avoidance latch. The latch is connected to the remote terminal 108 and prevents the device controller 108 from writing data to the remote terminal 106 (e.g., to registers 202) while the bus controller 104 is reading data from the remote terminal 106.

Figure 4:
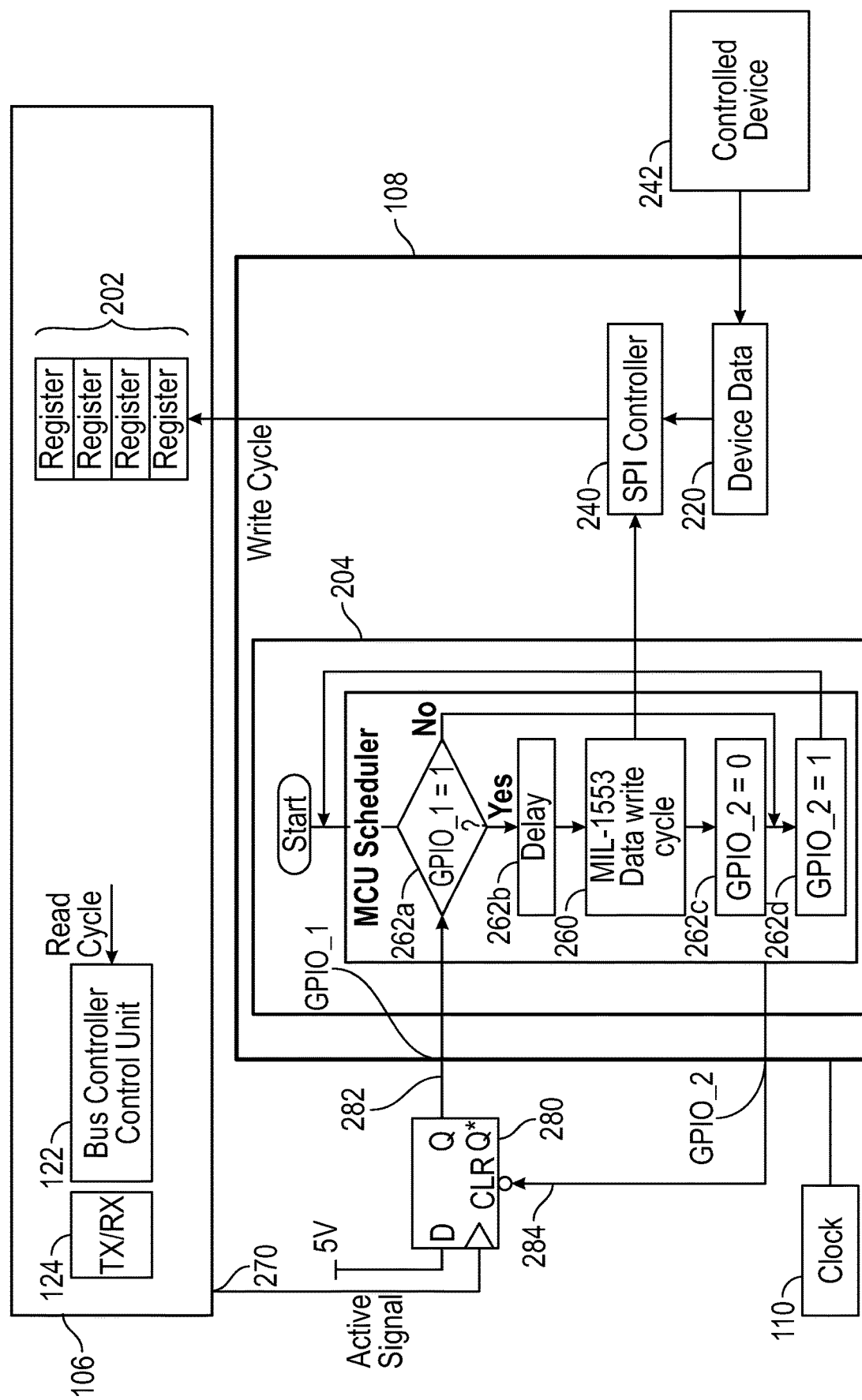
FIG. 4 is more detailed version of the remote terminal side of the system shown in FIG. 2.

FIG. 4 shows a more detailed version of the latch 280 and how the delay function 262 and the write cycle interact. As shown in FIG. 4, the latch 280 is implemented as a positive edge D flip flop. As is known in the art, the D flip-flop has a clock input (represented as a triangle), a D input, Q and Q* outputs, a pre-set input and a clear (CLR) input. The D input is connected to a logical one value (e.g., 5 v) and the clock input is connected to the active output 270. The Q output is provided control software 204 (and in particular, to the delay function 262). The control software 204 (e.g., the delay function 262) can also be connected to CLR input of the latch 280. In general, the latch will couple the positive D input to the Q output when a rising edge is detected on the clock input (e.g., when the active signal goes high). This signal will remain latched until a signal provided to the CLR input goes low (e.g., until reset signal 284 is a logical 0).

As noted above, the latch 280 is a rising edge flip flop in one embodiment. When the active signal goes high (assuming the reset signal 284 at CLR is low) Q will go to a high (logical 1) value. This value is provided to the delay function 262. In FIG. 4 the delay function is shown by steps 262a, 262b, 262c and 262d. These steps surround the typical write cycle 260 used in the MIL 1553 protocol.

In more detail, Q is provided to a decision block 262a as latched signal 282. At decision block 262a it is determined if the latched signal 282 is high. If it is it means that active output 270 is high. This can be, for example, because and the bus controller has ordered a read cycle. In such a case, processing proceeds to block 262 where a delay occurs. The delay is at least as long a read cycle. In this manner, the write cycle cannot begin until the read cycle has completed. While FIG. 4 shows the delay as 350 μs that is just an example. At the end of the delay, the write cycle 260 is performed and SPI controller 240 causes data in the device data store 220 to be moved into registers 202.

After the write cycle 260 has been completed, processing proceeds to block 262c. In block 262c a reset signal 284 is provided to the CLR input of the latch 280. It is initially driven low (block 262c) which resets the latch and then goes back high so the next rising edge can be caught (block 262d). This can be referred to as pulsing the CLR input herein.

If the latched signal is low (as determined at block 262a) processing proceeds directly to the block 262d. This will ensure that the signal on line 282 is driven high so that the MIL write cycle of block 260 is performed when there active read cycle requested.

For completeness and not by way of limitation, the latched signal 282 can be provided to a first general input/output pin (GPIO_1) of the device controller 108 and the reset signal 284 can be transmitted by to a second general input/output pin (GPIO_2) of the device controller 108.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

What is claimed is:

1. An asynchronous communication system configured to operate a MIL-1553 protocol, the system comprising:
   a bus;
   a bus controller coupled to the bus that is configured to control access to the bus;
   a remote terminal connected to the bus;
   a device controller connected to the remote terminal; and
   a read/write overlap avoidance latch connected to the remote terminal that provides an active signal to the device controller that prevents the device controller from writing data to the remote terminal while the bus controller is reading data from the device controller during a read cycle.

2. The system of claim 1, wherein the remote terminal generates the active signal output at an active output during a ready cycle commanded by the bus controller.

3. The system of claim 2, wherein the read/write overlap avoidance latch includes an input, a clock input and an output, wherein the input is connected to a power source, the clock is connected to the active output and the output is connected to the device controller, wherein the input is latched to the output on a rising edge of the active signal.

4. The system of claim 3, wherein the read/write overlap avoidance latch includes a clear input (CLR) that resets the output, wherein the device controller delays a write operation from the device controller to the remote terminal for a delay period.

5. The system of claim 4, wherein the delay period is greater than the read cycle.

6. The system of claim 5, wherein the read/write overlap avoidance latch is a rising edge D flip-flop.

7. The system of claim 6, wherein the device controller pulses the CLR input to reset the read/write overlap avoidance latch after the delay period.

8. The system of claim 1, wherein the device controller includes instructions that cause the device controller to transfer information from the device controller to the remote terminal during a write cycle.

9. The system of claim 8, wherein the device controller further includes instructions that causes the remote terminal to delay the write cycle during a read cycle.

10. The system of claim 9, wherein the device controller further includes instructions that causes the remote terminal to perform a write cycle and then rest the read/write overlap avoidance latch.

11. A method of operating asynchronous communication system according to a MIL-1553 protocol, the method comprising:
   providing a bus and a bus controller coupled to the bus that is configured to control access to the bus;
   connecting a remote terminal to the bus;
   connecting a device controller to the remote terminal;
   coupling a read/write overlap avoidance latch to the remote terminal; and
   providing an active signal to the device controller that prevents the device controller from writing data to the remote terminal while the bus controller is reading data from the device controller during a read cycle.

12. The method of claim 11, wherein the remote terminal generates the active signal output at an active output during a ready cycle commanded by the bus controller.

13. The method of claim 12, wherein the read/write overlap avoidance latch includes an input, a clock input and an output, wherein the input is connected to a power source, the clock is connected to the active output and the output is connected to the device controller, and wherein the input is latched to the output on a rising edge of the active signal.

14. The method of claim 13, wherein the read/write overlap avoidance latch includes a clear input (CLR) that resets the output, wherein method further includes:
    delaying a write operation from the device controller to the remote terminal for a delay period.

15. The method of claim 14, wherein the delay period is greater than the read cycle.

\* \* \* \* \*